(12) United States Patent
Hart

(10) Patent No.: US 9,235,562 B1
(45) Date of Patent: Jan. 12, 2016

(54) SYSTEMS AND METHODS FOR TRANSPARENT DATA LOSS PREVENTION CLASSIFICATIONS

(71) Applicant: Michael Hart, Mountain View, CA (US)

(72) Inventor: Michael Hart, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 389 days.

(21) Appl. No.: 13/633,846

(22) Filed: Oct. 2, 2012

(51) Int. Cl.
*G06F 17/27* (2006.01)

(52) U.S. Cl.
CPC ..................................... *G06F 17/27* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................... 704/1, 9, 10
See application file for complete search history.

(56) References Cited

U.S. PATENT DOCUMENTS

| | | | | |
|---|---|---|---|---|
| 7,089,241 | B1* | 8/2006 | Alspector | G06Q 10/107 1/1 |
| 8,839,245 | B1* | 9/2014 | Khajuria et al. | 718/1 |
| 2002/0103775 | A1* | 8/2002 | Quass et al. | 706/12 |
| 2006/0069678 | A1* | 3/2006 | Chou | G06F 17/30707 1/1 |
| 2008/0034083 | A1* | 2/2008 | Koran | 709/224 |
| 2009/0164416 | A1* | 6/2009 | Guha | G06F 17/30613 1/1 |
| 2009/0178137 | A1* | 7/2009 | Branson et al. | 726/22 |
| 2010/0010940 | A1* | 1/2010 | Spyropoulos et al. | 706/12 |
| 2010/0024037 | A1* | 1/2010 | Grzymala-Busse et al. | 726/26 |
| 2010/0076984 | A1* | 3/2010 | Papadopoullos et al. | 707/749 |
| 2010/0179936 | A1* | 7/2010 | Jeremiah | 706/50 |
| 2011/0093768 | A1* | 4/2011 | Panwar | 714/809 |
| 2011/0280481 | A1* | 11/2011 | Radakovic et al. | 382/177 |
| 2012/0136812 | A1* | 5/2012 | Brdiczka | 706/12 |
| 2012/0303558 | A1* | 11/2012 | Jaiswal | 706/12 |
| 2013/0013345 | A1* | 1/2013 | Wallquist et al. | 705/4 |
| 2013/0096980 | A1* | 4/2013 | Basavapatna et al. | 705/7.28 |
| 2014/0304197 | A1* | 10/2014 | Jaiswal et al. | 706/12 |

OTHER PUBLICATIONS

Thorsten Joachims; Transductive Inference for Text Classification using Support Vector Machines; http://www1.cs.columbia.edu/~dplewis/candidacy/joachims99transductive.pdf, as accessed Jun. 8, 2012; Dortmund, Germany.

(Continued)

*Primary Examiner* — Lamont Spooner
(74) *Attorney, Agent, or Firm* — ALG Intellectual Property, LLC

(57) ABSTRACT

A computer-implemented method for transparent data loss prevention classifications may include 1) identifying a document that received a classification by a machine learning classifier for data loss prevention, 2) identifying at least one linguistic constituent within the document that contributed to the classification, 3) identifying a relevant passage of the document that contextualizes the linguistic constituent, and 4) displaying a user interface including the linguistic constituent in context of the relevant passage. Various other methods, systems, and computer-readable media are also disclosed.

19 Claims, 8 Drawing Sheets

(56) References Cited

OTHER PUBLICATIONS

Raymond J. Mooney, et al; Content-Based Book Recommending Using Learning for Text Categorization; SIGIR-99 Workshop on Recommender Systems: Algorithms and Evaluations, Berkeley, CA, Aug. 1999; http://www.cs.utexas.edu/~ml/papers/libra-sigir-wkshp-99.pdf, as accessed Jun. 8, 2012; Austin, Texas.

Michael Hart, et al; Systems and Methods for Classifying Documents for Data Loss Prevention; U.S. Appl. No. 13/405,293, filed Feb. 25, 2012.

* cited by examiner

SYSTEMS AND METHODS FOR TRANSPARENT DATA LOSS PREVENTION CLASSIFICATIONS

BACKGROUND

In the electronic information age, people may share, access, and disseminate high volumes of information. The ease with which information may be disseminated electronically is empowering. At the same time, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are therefore increasingly looking to data loss prevention ("DLP") solutions to protect their sensitive data.

Traditional DLP systems may and intercept data at a variety of points in a computing system in efforts to detect and regulate the flow and access of sensitive data. Some traditional DLP systems may allow administrators to define keywords and/or regular expressions to identify potentially sensitive documents. Additionally or alternatively, some traditional DLP systems may employ classifiers generated with machine learning techniques. For example, these DLP systems may use training documents supplied by administrators to generate classifiers, and then apply the classifiers to documents to make DLP classifications. Unfortunately, these machine-learning based classifiers may function without administrators understanding the basis for many of their classifications. Furthermore, these classifiers may yield an unacceptable rate of false positives. Accordingly, the instant disclosure identifies and addresses a need for systems and methods for transparent data loss prevention classifications.

SUMMARY

As will be described in greater detail below, the instant disclosure generally relates to systems and methods for transparent data loss prevention classifications by identifying passages within documents that contain elements that contributed to the classifications of the documents and displaying these elements in the context of their surrounding passages (e.g., to a data loss prevention administrator). In one example, a computer-implemented method for transparent data loss prevention classifications may include 1) identifying a document that received a classification by a machine learning classifier for data loss prevention, 2) identifying at least one linguistic constituent within the document that contributed to the classification, 3) identifying a relevant passage of the document that contextualizes the linguistic constituent, and 4) displaying a user interface including the linguistic constituent in context of the relevant passage.

In some examples, identifying the linguistic constituent may include 1) identifying multiple linguistic constituents within the document that contributed to the classification and 2) selecting the linguistic constituent based at least in part on the degree to which the linguistic constituent contributed to the classification. Additionally or alternatively, identifying the linguistic constituent may include 1) identifying multiple linguistic constituents within the document that contributed to the classification, 2) identifying a candidate passage that includes the multiple linguistic constituents, and 3) selecting the linguistic constituent based at least in part on the degree to which the candidate passage contributed to the classification.

In some embodiments, displaying the user interface may include displaying the linguistic constituent highlighted within the relevant passage. In one example, the computer-implemented method may also include receiving user input via the user interface indicating that the machine learning classifier misclassified the document. In some examples, the computer-implemented method may include receiving user input via the user interface indicating a type of mistake that potentially caused the machine learning classifier to misclassify the document. In these examples, the type of mistake may include 1) a use of a numerical constituent by the classifier, 2) a use of a polysemous constituent by the classifier, 3) a use of a common constituent by the classifier, and/or 4) a use of a constituent that is common within an enterprise that is protected by a data loss prevention system that uses the machine learning classifier. Additionally or alternatively, in these examples, the computer-implemented method may also include modifying the machine learning classifier in response to receiving the user input indicating the type of mistake.

In one embodiment, a system for implementing the above-described method may include 1) an identification module programmed to identify a document that received a classification by a machine learning classifier for data loss prevention, 2) a constituent module programmed to identify at least one linguistic constituent within the document that contributed to the classification, 3) a contextualization module programmed to identify a relevant passage of the document that contextualizes the linguistic constituent, and 4) a interface module programmed to display a user interface comprising the linguistic constituent in context of the relevant passage. The system may also include at least one processor configured to execute the identification module, the constituent module, the contextualization module, and the interface module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a document that received a classification by a machine learning classifier for data loss prevention, 2) identify at least one linguistic constituent within the document that contributed to the classification, 3) identify a relevant passage of the document that contextualizes the linguistic constituent, and 4) display a user interface including the linguistic constituent in context of the relevant passage.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
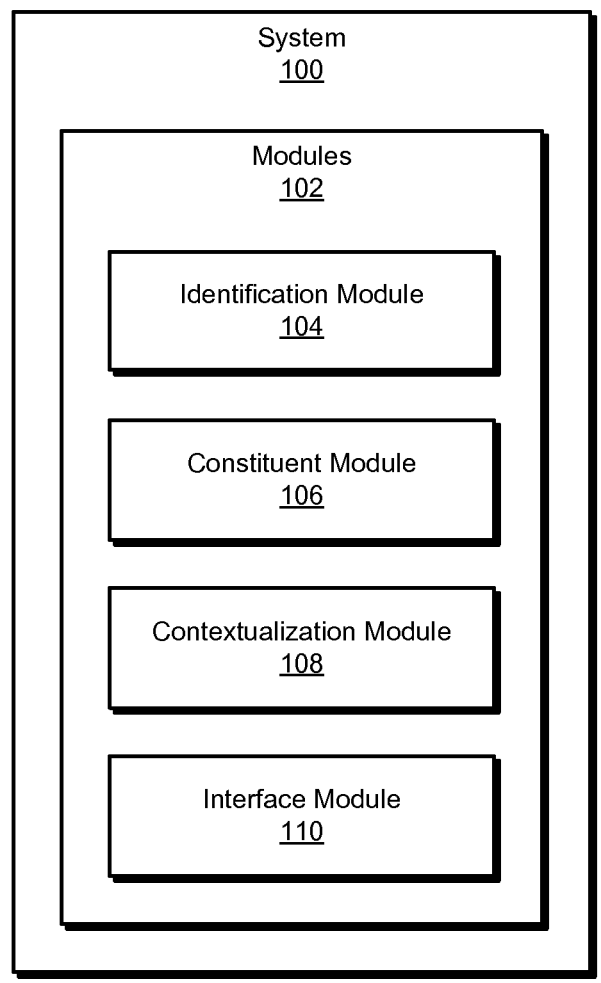
FIG. 1 is a block diagram of an exemplary system for transparent data loss prevention classifications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for transparent data loss prevention classifications. As will be explained in greater detail below, by identifying passages within documents that contain elements that contributed to the classifications of the documents and displaying these elements in the context of their surrounding passages (e.g., to a data loss prevention administrator), the systems and methods described herein may enable data loss prevention administrators to understand the basis of the classifications. Accordingly, in some examples, these systems and methods may also enable administrators to use information about the basis of the classifications to improve data loss prevention classifiers. For example, these systems and methods may enable administrators to see the types of errors committed by data loss prevention classifiers and to provide specific input for resolving the observed types of errors. Accordingly, these systems and methods may potentially increase administrator trust in data loss prevention classifiers and empower administrators to tailor data loss prevention classifiers to particular enterprise environments (e.g., to reduce the rate of false positives committed by data loss prevention classifiers).

Figure 2:
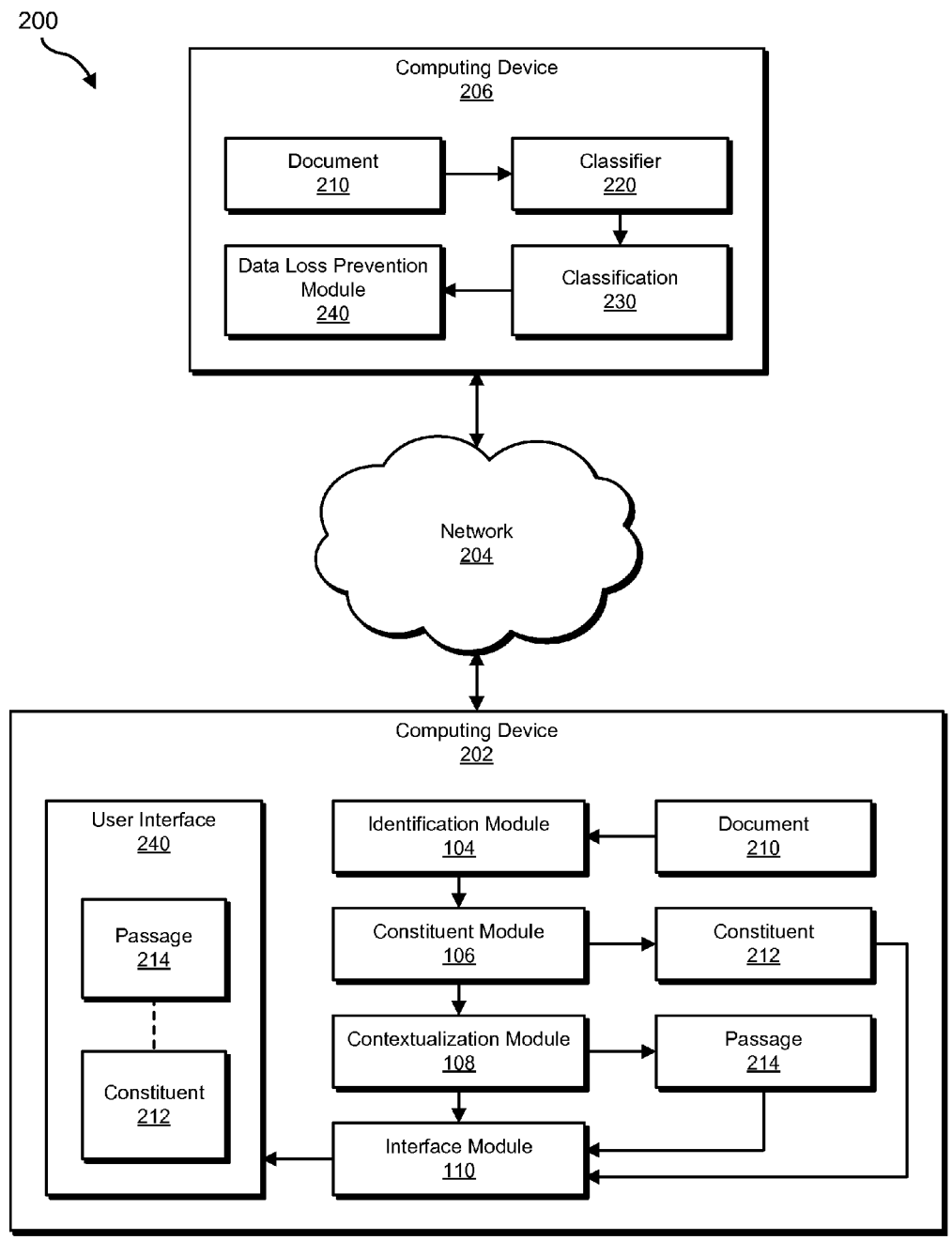
FIG. 2 is a block diagram of an exemplary system for transparent data loss prevention classifications.
Figure 5:
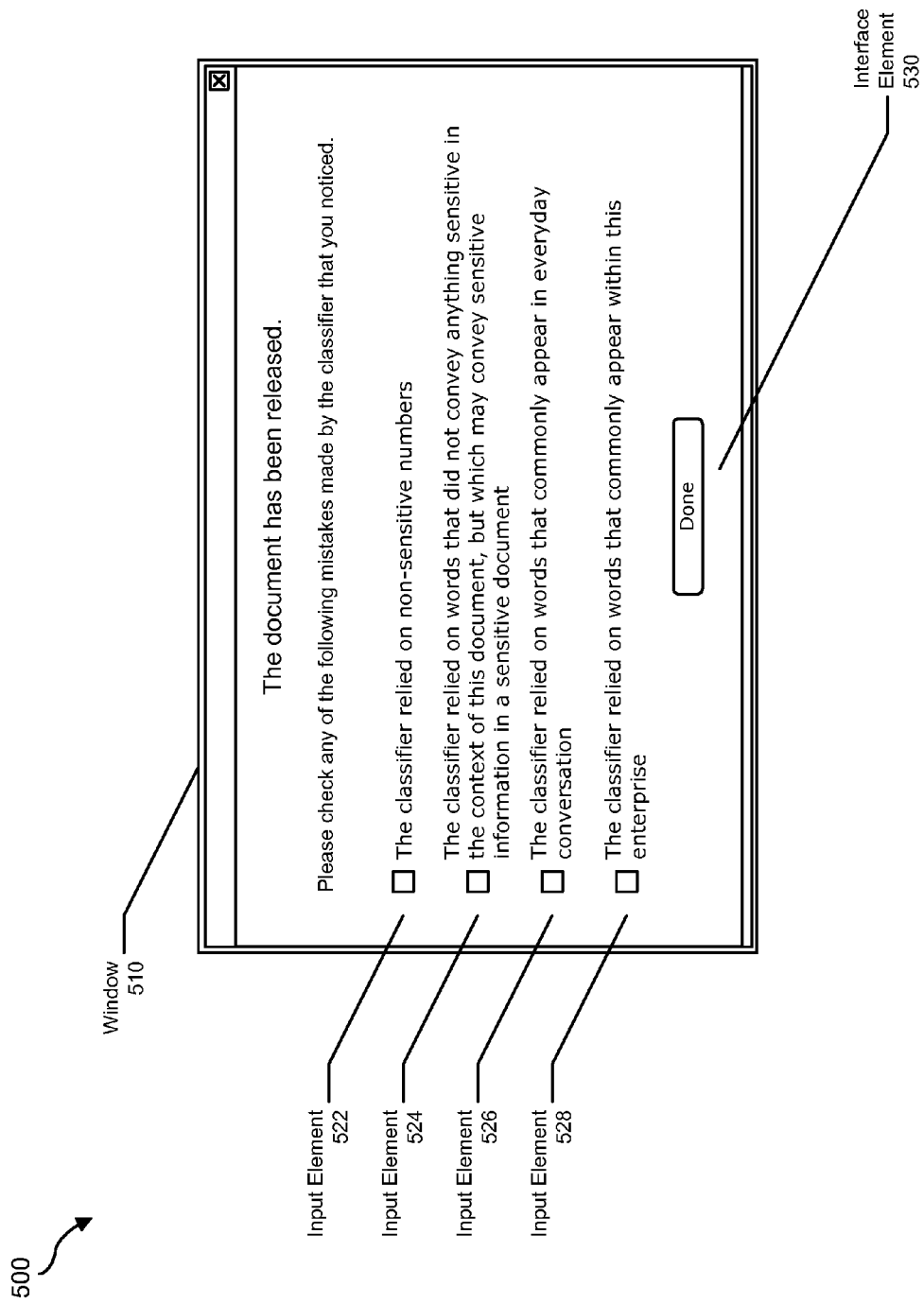
FIG. 5 is an illustration of an exemplary user interface for transparent data loss prevention classifications.
Figure 6:
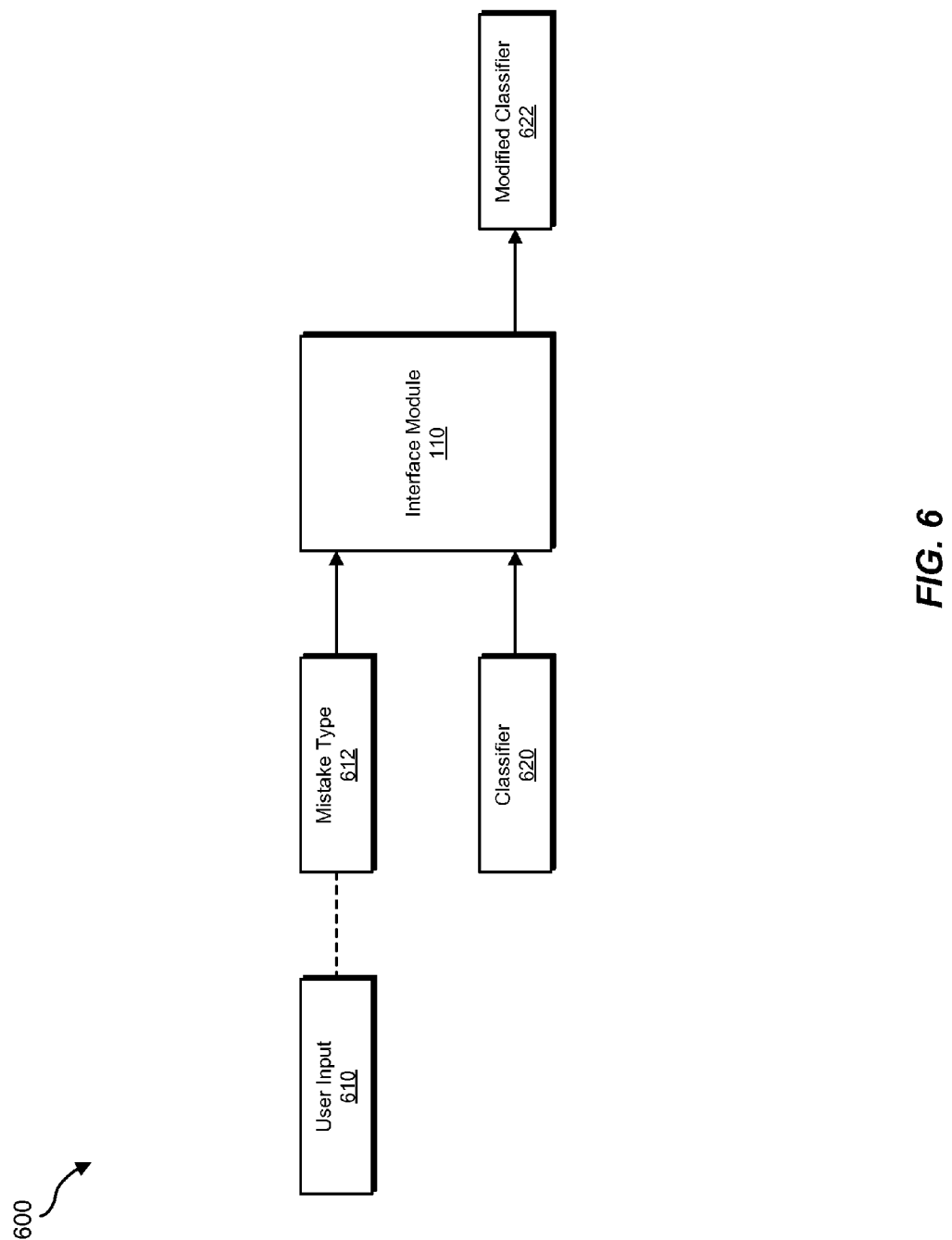
FIG. 6 is a block diagram of an exemplary system for transparent data loss prevention classifications.

The following will provide, with reference to FIGS. 1, 2, and 6, detailed descriptions of exemplary systems for transparent data loss prevention classifications. Detailed descriptions of corresponding computer-implemented methods will also be provided in connection with FIG. 3. Detailed descriptions of exemplary user interfaces will be provided in connection with FIGS. 4 and 5. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for transparent data loss prevention classifications. As illustrated in this figure, exemplary system 100 may include one or more modules 102 for performing one or more tasks. For example, and as will be explained in greater detail below, exemplary system 100 may include an identification module 104 programmed to identify a document that received a classification by a machine learning classifier for data loss prevention. Exemplary system 100 may also include a constituent module 106 programmed to identify at least one linguistic constituent within the document that contributed to the classification.

In addition, and as will be described in greater detail below, exemplary system 100 may include a contextualization module 108 programmed to identify a relevant passage of the document that contextualizes the linguistic constituent. Exemplary system 100 may also include an interface module 110 programmed to display a user interface comprising the linguistic constituent in context of the relevant passage. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. Computing device 202 may be programmed with one or more of modules 102. Additionally or alternatively, computing device 206 may be programmed with one or more of modules 102.

In one embodiment, one or more of modules 102 from FIG. 1 may, when executed by at least one processor of computing device 202 and/or computing device 206, facilitate computing device 202 and/or computing device 206 in transparent data loss prevention classifications. In one example, computing device 206 (e.g., a client device from which a document 210 has been created, accessed, moved, and/or stored) may report a classification 230 of document 210 by a classifier 220 to computing device 202 (e.g., a data loss prevention administration system). For example, and as will be described in greater detail below, one or more of modules 102 may cause computing device 202 and/or computing device 206 to 1) identify document 210 that received classification 230 by a machine learning classifier 220 for data loss prevention (e.g., to be provided to a data loss prevention module 240 for remediation), 2) identify at least one linguistic constituent 212 within document 210 that contributed to classification 230, 3) identify a relevant passage 214 of document 210 that contextualizes constituent 212, and 4) display a user interface 240 including constituent 212 in context of passage 214.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Computing device 206 generally represents any type or form of computing device capable of reading computer-executable instructions. Examples of computing device 206 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and computing device 206.

Figure 3:
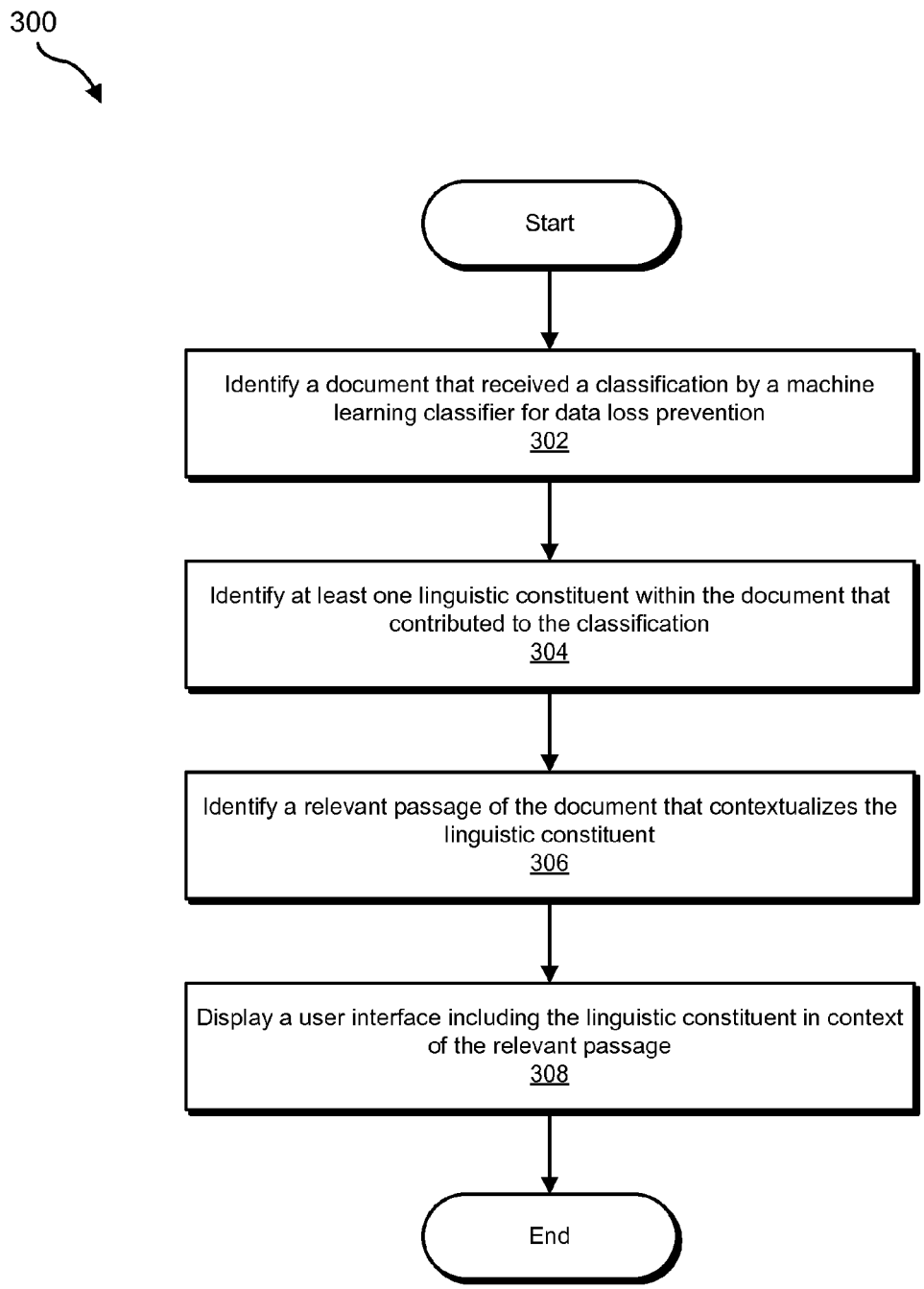
FIG. 3 is a flow diagram of an exemplary method for transparent data loss prevention classifications.

FIG. 3 is a flow diagram of an exemplary computer-implemented method 300 for transparent data loss prevention classifications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a document that received a classification by a machine learning classifier for data loss prevention. For example, at step 302 identification module 104 may, as part of computing device 202 in FIG. 2, identify document 210 that received classification 230 by machine learning classifier 220 for data loss prevention (e.g., to be provided to data loss prevention module 240 for remediation).

As used herein, the term "document" may refer to any data object that may be of interest in a data loss prevention determination. For example, a document may include a file, an email, etc. Additionally or alternatively, a document may include the textual content of a data object (e.g., the plain text contents of a word processing document, an email, etc.).

As used herein, the phrase "machine learning" may refer to any technique for computer-enabled empirical assessments. For example, the phrase "machine learning" may refer to one or more supervised learning techniques for analyzing future inputs based on an analysis of training data. As used herein, the term "classifier" may refer to any algorithm, formula, rule, module, and/or filter for classifying, labeling, categorizing, rating, and/or scoring an input. Accordingly, the phrase "machine learning classifier" may refer to any classifier generated, defined, and/or configured at least in part by a machine learning technique. In some examples, the machine learning classifier may use one or more keywords and/or phrases as features for classifying documents.

In some examples, the machine learning technique used to generate the machine learning classifier may use a corpus of training documents to generate the machine learning classifier. As used herein, the phrase "training document" may refer to any input to a machine learning system to contribute to the generation, definition, and/or configuration of a machine learning classifier. For example, a machine learning system may take a training document and a classification of the training document as input with the object of generating a classifier that provides the same classification to like documents. In some examples, the corpus of training documents may include documents considered to have one or more characteristics relevant to at least one data loss prevention policy. For example, the corpus of training documents may include documents regarded as sensitive and/or confidential (e.g., a "positive set"). For example, the positive set may include customer information, source code, contracts, and/or documents covered by standards and/or regulations such as the Health Insurance Portability and Accountability Act, the Payment Card Industry Data Security Standard, etc. Additionally, in some examples, another corpus of training documents may include documents regarded as non-sensitive (e.g., a "negative set"). For example, the negative set may include public-facing advertising materials, personal emails, and/or publicly-accessible Internet documents. Accordingly, the machine learning classifier may be configured to provide input for data loss prevention determinations to identify sensitive and/or confidential documents.

As used herein, the phrase "data loss prevention" may refer to a technique for protecting sensitive information by applying one or more policies, rules, and/or heuristics to data within the bounds of a data loss prevention system to determine the disposition of the data in various scenarios. In some examples, a data loss prevention system may be configured to prevent sensitive information from leaking (e.g., being transmitted outside the bounds of the system under uncontrolled circumstances). Additionally or alternatively, a data loss prevention system may be configured to prevent sensitive information from being misused and/or insecurely stored.

Identification module 104 may identify the document in any suitable context. For example, identification module 104 may identify the document by receiving a message from a data loss prevention agent after the machine learning classifier classified the document as sensitive. In some examples, identification module 104 may operate as a part of a data loss prevention administration system.

Returning to FIG. 3, at step 304 one or more of the systems described herein may identify at least one linguistic constituent within the document that contributed to the classification. For example, at step 304 constituent module 106 may, as part of computing device 202 in FIG. 2, identify at least one linguistic constituent 212 within document 210 that contributed to classification 230.

As used herein, the phrase "linguistic constituent" (or "constituent") may refer to any word, phrase, morpheme, and/or other lexical unit usable as a feature by a machine learning classifier.

Constituent module 106 may identify the linguistic constituent within the document that contributed to the classification in any suitable manner. For example, the machine learning classifier may produce annotated results that identify constituents within the document used for classifying the document and/or locations of such constituents within the document. In this example, constituent module 106 may receive the annotated results from the machine learning classifier to identify the linguistic constituent within the document.

In some examples, constituent module 106 may identify multiple linguistic constituents within the document that contributed to the classification and select the linguistic constituent based at least in part on the degree to which the linguistic constituent contributed to the classification. For example, constituent module 106 may identify scalar values that describe the degree to which the various linguistic constituents contributed to the classification and/or confidence levels attributed to the various linguistic constituents indicating that the document is sensitive. Constituent module 106 may then select the linguistic constituent based on the linguistic constituent being associated with a higher scalar value.

In some examples, constituent module 106 may 1) identify multiple linguistic constituents within the document that contributed to the classification, 2) identify a candidate passage that includes the multiple linguistic constituents, and 3) select the linguistic constituent based at least in part on the degree to which the candidate passage contributed to the classification. For example, constituent module 106 may search the document to identify five non-overlapping windows of 25 words and/or phrases that contribute most to the classification. In this example, constituent module 106 may also filter out one or more of the five non-overlapping windows whose contributions fail to meet a predetermined threshold. Constituent module 106 may then identify the linguistic constituent as a constituent within one of the identified non-overlapping windows.

As used herein, the term "passage" may refer to any selection, snippet, and/or cluster, of linguistic constituents within a document. For example, the passage may include a certain number of words and/or phrases, a paragraph, etc. In some examples, important features within documents may tend to cluster together within a document (e.g., appear in the same paragraphs together). Accordingly, as will be explained in greater detail below, by identifying important passages, the systems and methods described herein may enable administrators to efficiently review classifications performed on documents.

Returning to FIG. 3, at step 306 one or more of the systems described herein may identify a relevant passage of the document that contextualizes the linguistic constituent. For example, at step 306 contextualization module 108 may, as part of computing device 202 in FIG. 2, identify relevant passage 214 of document 210 that contextualizes constituent 212.

As used herein, the term "context" as it relates to a linguistic constituent within a document may refer to any additional text within the document that is potentially useful for evaluating the use of the linguistic constituent to classify the document. For example, contextualization module 108 may identify the relevant passage that contextualizes the linguistic constituent by identifying a passage in which the linguistic constituent appears.

Contextualization module 108 may identify the relevant passage in any of a variety of ways. For example, as mentioned earlier, in some examples the systems and methods described herein may identify linguistic constituents of interest by identify passages of interest. In these examples, contextualization module 108 may identify the relevant passage simply by identifying a passage of interesting that includes one or more linguistic constituents of interest (e.g., including the linguistic constituent). Additionally or alternatively, contextualization module 108 may identify the relevant passage by identifying text surrounding the linguistic constituent. In some examples, contextualization module 108 may identify a certain number of words and/or phrases that proceed and/or follow the linguistic constituent. Additionally or alternatively, contextualization module 108 may identify the beginning and/or end of a sentence and/or paragraph to determine the bounds of the passage within the document.

Returning to FIG. 3, at step 308 one or more of the systems described herein may display a user interface including the linguistic constituent in context of the relevant passage. For example, at step 308 interface module 110 may, as part of computing device 202 in FIG. 2, display user interface 240 including constituent 212 in context of passage 214.

Interface module 110 may display the user interface in any suitable format and including any of a variety of elements and/or information. For example, interface module 110 may present an interface that includes the relevant passage (and, e.g., one or more additional passages that contributed most to the classification). Additionally or alternatively, interface module 110 may present the interface including information regarding how important the passage was to the classification (e.g., the output of a linear kernel function). In some examples, interface module 110 may also present one or more navigational elements (e.g., buttons) for viewing other relevant passages within the document.

In some examples, interface module 110 may display the linguistic constituent highlighted within the relevant passage. For example, interface module 110 may display the linguistic constituent with different colors, a different font, a different style, and/or a different size than the surrounding passage text.

In some examples, interface module 110 may also receive user input via the user interface indicating that the machine learning classifier misclassified the document. As used herein, the phrase "user input" may refer to any entered data and/or interaction with an element of the user interface. For example, the user input may include a click event on a button, a checkbox, etc. In some examples, the user input may indicate that the document should not be classified as a sensitive document, and interface module 110 may send a message to a data loss prevention agent to release the document in response (e.g., to allow storage of, access to, and/or movement of the document).

In some examples, interface module 110 may additionally receive user input via the user interface indicating a type of mistake that potentially caused the machine learning classifier to misclassify the document. The type of mistake may include any of a variety of potential pitfalls for machine-learning based classification. For example, the type of mistake may include a use of a numerical constituent by the classifier. As used herein, the phrase "numerical constituent" may refer to any textually-expressed number. In some examples, the phrase "numerical constituent" may refer to a textually-expressed number of a value below a certain threshold (e.g., any number of three digits or fewer). In another example, the type of mistake may include the use of a polysemous constituent by the classifier. As used herein, the phrase "polysemous constituent" may refer to any constituent that is potentially semantically ambiguous (e.g., a word with more than one meaning). In one example, the type of mistake may include the use of a common constituent by the classifier. As used herein, the phrase "common constituent" may refer to any constituent that is prevalent within a language (e.g., beyond a defined threshold), that is used in non-specialized discourse (e.g., that doesn't apply to specific topics, such as sensitive topics protected by a data loss prevention system), and/or that may be commonly found in documents outside of an enterprise protected by a data loss prevention system. In some examples, the type of mistake may include the use of a constituent that is common within an enterprise that is protected by a data loss prevention system that uses the machine learning classifier. For example, the type of mistake may be that the classifier has relied on a word corresponding to a topic that relates to an endeavor of the enterprise, but which does not indicate sensitive topics relating to the enterprise.

In some examples, interface module 110 may also modify the machine learning classifier in response to receiving the user input indicating the type of mistake. For example, the classifier may have classified the document as sensitive based in part on the presence of the number "32" within the document (e.g., due to an overfitting mistake arising in part from sensitive documents in a positive training set happening to disproportionately include the number "32"). For example, a group of sensitive contracts based on the same template and used to train the machine learning classifier may all have included section numbering up to the number "32." Accordingly, when an administrator sees that the number "32" has caused the machine learning classifier to classify the document as sensitive, the administrator may provide user input to interface module 110 indicating that the classifier erroneously relied on a numerical constituent to classify the document, and interface module 110 may modify the machine learning classifier (e.g., to ignore the number "32" as a feature, to ignore numbers "32" and below as features, to reduce weight on numbers as features, etc.).

As another example, the classifier may have classified the document as sensitive based in part on a polysemous constituent. For example, the classifier may have classified the document as sensitive based in part on the presence of the term "account" (e.g., a financial firm may have trained the classifier on sensitive documents referring to specific accounts), but the document may use the term "account" to mean "story" rather than a financial account. Accordingly, when an administrator sees that a use of "account" with the non-sensitive meaning has caused the machine learning classifier to classify the document as sensitive, the administrator may provide user input to interface module 110 indicating that the classifier mistakenly classified the document as sensitive based on a term that can have a sensitive meaning but which did not in the document. Interface module 110 may then modify the machine learning classifier (e.g., to reevaluate the term "account" in the training documents by identifying terms that appear proximate to "account" in the positive set and only giving weight to "account" when the same terms are proximate).

As an additional example, the classifier may have classified the document as sensitive based in part on a common constituent. For example, the classifier may have classified the document as sensitive based in part on the presence of the term "account" (e.g., possibly indicating overfitting and/or an insufficiently large and/or diverse negative training set). Accordingly, an administrator may provide user input to interface module 110 indicating that the classifier mistakenly classified the document as sensitive based on a common term. Interface module 110 may then modify the machine learning classifier (e.g., by crawling the Internet for additional documents for the negative training set). Additionally or alternatively, interface module 110 may display a message suggesting that the administrator improve the negative training set by including more general-topic documents and/or publicly available documents.

In one example, the classifier may have classified the document as sensitive based in part on a constituent that is common within the enterprise that is protected by the data loss prevention system that uses the classifier. For example, the classifier may have classified the document as sensitive based in part on the term "loan" (e.g., where the enterprise belongs to a lending institution). Accordingly, an administrator may recognize that the term "loan" may appear in many non-sensitive documents within the enterprise (e.g., including outward-facing public documents, such as advertisements, informative documents, etc.) and provide user input to interface module 110 indicating such. Interface module 110 may then modify the machine learning classifier (e.g., by crawling non-sensitive locations within the enterprise, such as a public website, for additional negative training documents; by crawling websites of similar institutions for additional negative training documents; etc.). Additionally or alternatively, interface module 110 may display a message suggesting that the administrator improve the negative training set by including more non-sensitive internal documents and/or publicly available documents within the same industry.

Figure 4:
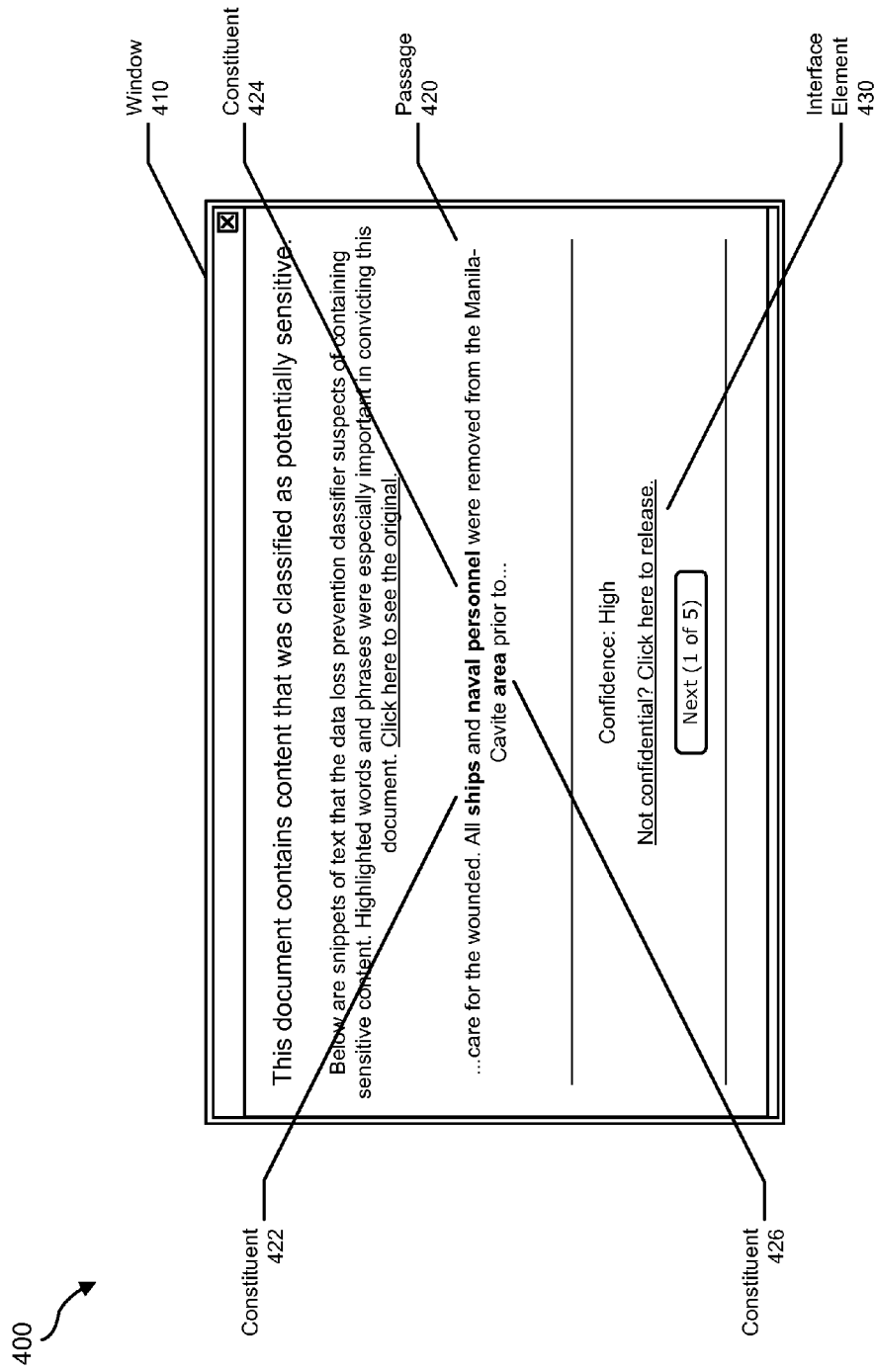
FIG. 4 is an illustration of an exemplary user interface for transparent data loss prevention classifications.

FIG. 4 illustrates an exemplary user interface 400 for transparent data loss prevention classifications. As shown in FIG. 4, exemplary user interface 400 may include a window 410 displaying a passage 420 with constituents 422, 424, and 426. Constituents 422, 424, and 426 may be highlighted (e.g., bolded) within passage 420. Window 410 may also display an interface element 430 for designating the document as non-sensitive.

FIG. 5 illustrates an exemplary user interface 500 for transparent data loss prevention classifications. As shown in FIG. 5, exemplary user interface 500 may include a window 510 presenting input elements 522, 524, 526, and 528. For example, input element 522 may include a checkbox whereby an administrator may indicate that the classifier mistakenly used a numerical constituent. Input element 524 may include a checkbox whereby an administrator may indicate that the classifier mistakenly used a polysemous constituent. Input element 526 may include a checkbox whereby an administrator may indicate that the classifier mistakenly used a common constituent. Input element 528 may include a checkbox whereby an administrator may indicate that the classifier mistakenly used a constituent that is common within the enterprise (e.g., including in non-sensitive documents). Window 510 may also present an interface element 530 for submitting the input of input elements 522, 524, 526, and 528 (e.g., to modify the classifier in response to the types of mistakes identified).

FIG. 6 illustrates an exemplary system 600 for transparent data loss prevention classifications. As shown in FIG. 6, exemplary system 600 may include interface module 110. In one example, interface module 110 may receive user input 610 identifying a mistake type 612 as input and transform a classifier 620 into a modified classifier 622 (e.g., so that modified classifier 622 will be less likely to produce mistake type 612).

As explained above, by identifying passages within documents that contain elements that contributed to the classifications of the documents and displaying these elements in the context of their surrounding passages (e.g., to a data loss prevention administrator), the systems and methods described herein may enable data loss prevention administrators to understand the basis of the classifications. Accordingly, in some examples, these systems and methods may also enable administrators to use information about the basis of the classifications to improve data loss prevention classifiers. For example, these systems and methods may enable administrators to see the types of errors committed by data loss prevention classifiers and to provide specific input for resolving the observed types of errors. Accordingly, these systems and methods may potentially increase administrator trust in data loss prevention classifiers and empower administrators to tailor data loss prevention classifiers to particular enterprise environments (e.g., to reduce the rate of false positives committed by data loss prevention classifiers).

Figure 7:
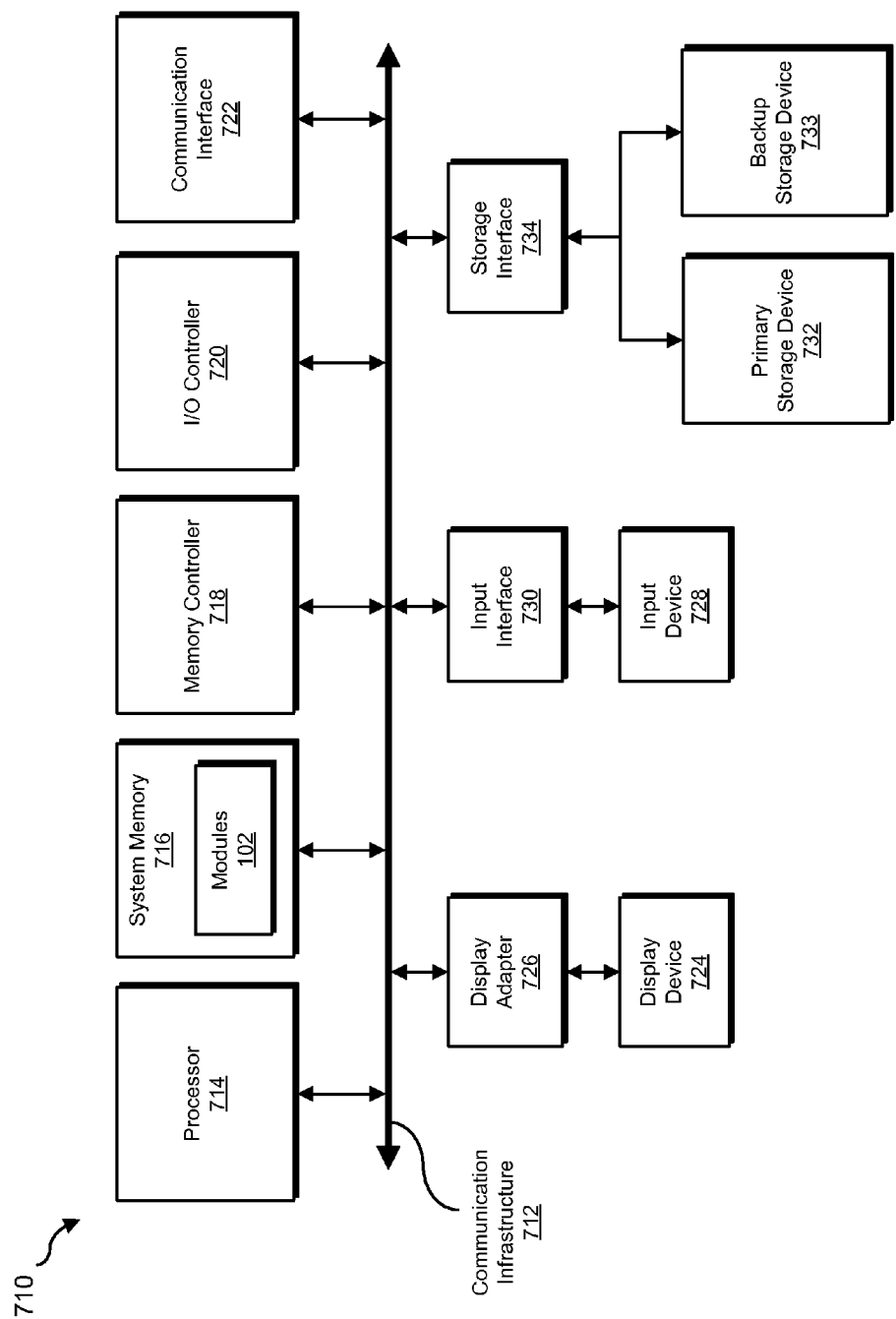
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, selecting, displaying, receiving, and modifying steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
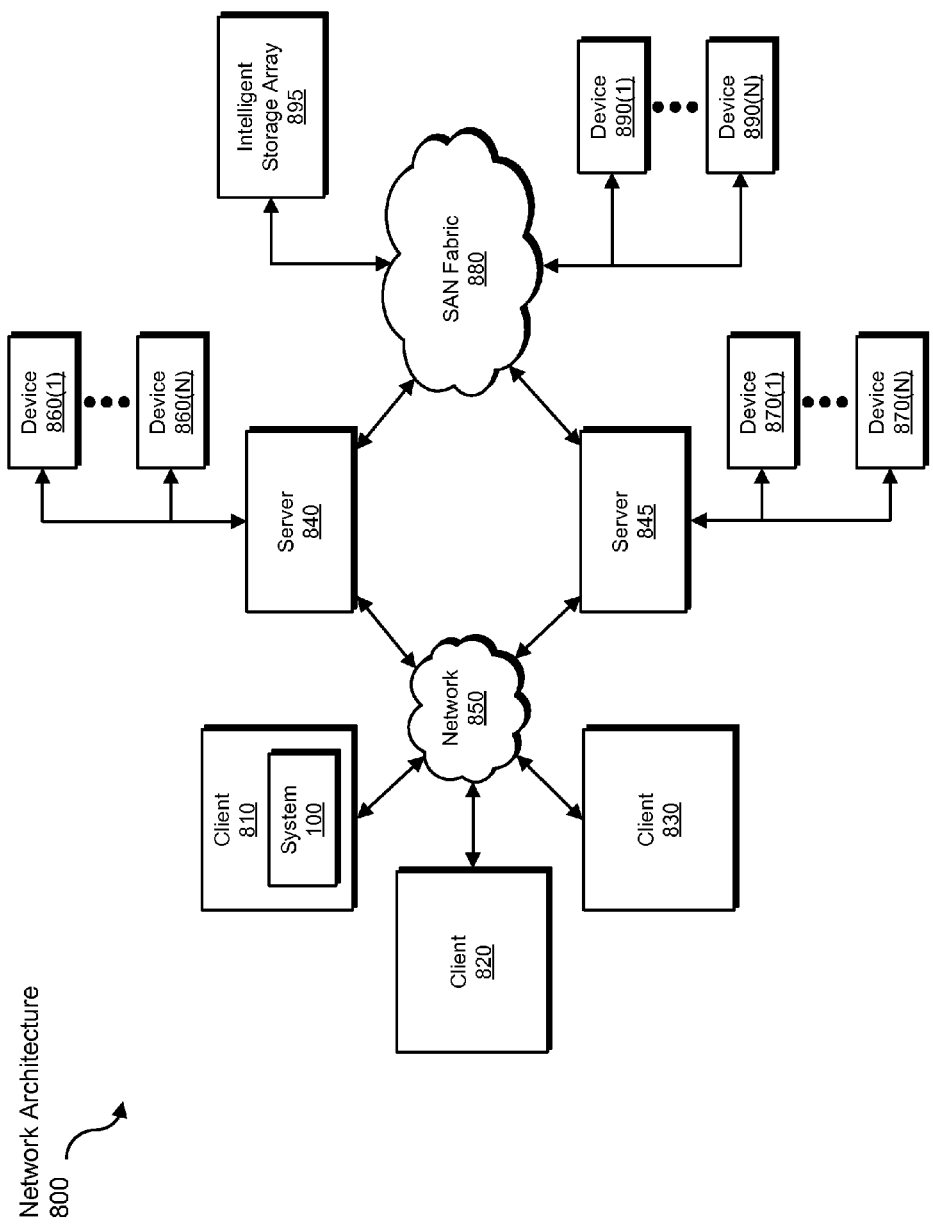
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, selecting, displaying, receiving, and modifying steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for transparent data loss prevention classifications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a machine learning classifier to be transformed, transform the machine learning classifier, use the result of the transformation to more accurately classify documents, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for transparent data loss prevention classifications, at least a portion of the method being performed by a computing device comprising at least one processor, the method comprising:
   identifying a document that received a classification by a machine learning classifier for data loss prevention;
   identifying at least one linguistic constituent within the document that contributed to the classification;
   identifying a relevant passage of the document that contextualizes the linguistic constituent;
   displaying a user interface comprising the linguistic constituent in context of the relevant passage;
   receiving user input via the user interface indicating a type of mistake, selected via the user interface from a plurality of types of mistakes, that potentially caused the machine learning classifier to misclassify the document, wherein indicating the type of mistake that potentially caused the machine learning classifier to misclassify the document comprises indicating a basis of classification relied upon by the machine learning classifier that resulted in the machine learning classifier misclassifying the document.

2. The computer-implemented method of claim 1, further comprising providing, via the user interface, a selection element for selecting from the plurality of types of mistakes in response to receiving user input via the user interface indicating that the machine learning classifier misclassified the document.

3. The computer-implemented method of claim 1, wherein the type of mistake comprises at least one of:
   a use of a numerical constituent by the classifier;
   a use of a polysemous constituent by the classifier;

a use of a common constituent by the classifier;
a use of a constituent that is common within an enterprise that is protected by a data loss prevention system that uses the machine learning classifier.

4. The computer-implemented method of claim 1, further comprising modifying the machine learning classifier in response to receiving the user input indicating the type of mistake.

5. The computer-implemented method of claim 1, wherein displaying the user interface comprising the linguistic constituent in context of the relevant passage comprises displaying the linguistic constituent highlighted within the relevant passage.

6. The computer-implemented method of claim 1, wherein identifying the linguistic constituent within the document that contributed to the classification comprises:
    identifying a plurality of linguistic constituents within the document that contributed to the classification;
    selecting the linguistic constituent based at least in part on a degree to which the linguistic constituent contributed to the classification.

7. The computer-implemented method of claim 1, wherein identifying the linguistic constituent within the document that contributed to the classification comprises:
    identifying a plurality of linguistic constituents within the document that contributed to the classification;
    identifying a candidate passage comprising the plurality of linguistic constituents;
    selecting the linguistic constituent based at least in part on a degree to which the candidate passage contributed to the classification.

8. A system for transparent data loss prevention classifications, the system comprising:
    an identification module programmed to identify a document that received a classification by a machine learning classifier for data loss prevention;
    a constituent module programmed to identify at least one linguistic constituent within the document that contributed to the classification;
    a contextualization module programmed to identify a relevant passage of the document that contextualizes the linguistic constituent;
    a interface module programmed to:
    display a user interface comprising the linguistic constituent in context of the relevant passage;
    receive user input via the user interface indicating a type of mistake, selected via the user interface from a plurality of types of mistakes, that potentially caused the machine learning classifier to misclassify the document, wherein indicating the type of mistake that potentially caused the machine learning classifier to misclassify the document comprises indicating a basis of classification relied upon by the machine learning classifier that resulted in the machine learning classifier misclassifying the document;
    at least one processor configured to execute the identification module, the constituent module, the contextualization module, and the interface module.

9. The system of claim 8, wherein the interface module is further programmed to provide, via the user interface, a selection element for selecting from the plurality of types of mistakes in response to receiving user input via the user interface indicating that the machine learning classifier misclassified the document.

10. The system of claim 8, wherein the type of mistake comprises at least one of:
    a use of a numerical constituent by the classifier;
    a use of a polysemous constituent by the classifier;
    a use of a common constituent by the classifier;
    a use of a constituent that is common within an enterprise that is protected by a data loss prevention system that uses the machine learning classifier.

11. The system of claim 8, wherein the interface module is further programmed to modify the machine learning classifier in response to receiving the user input indicating the type of mistake.

12. The system of claim 8, wherein the interface module is programmed to display the user interface comprising the linguistic constituent in context of the relevant passage by displaying the linguistic constituent highlighted within the relevant passage.

13. The system of claim 8, wherein the constituent module is programmed to identify the linguistic constituent within the document that contributed to the classification by:
    identifying a plurality of linguistic constituents within the document that contributed to the classification;
    selecting the linguistic constituent based at least in part on a degree to which the linguistic constituent contributed to the classification.

14. The system of claim 8, wherein the constituent module is programmed to identify the linguistic constituent within the document that contributed to the classification by:
    identifying a plurality of linguistic constituents within the document that contributed to the classification;
    identifying a candidate passage comprising the plurality of linguistic constituents;
    selecting the linguistic constituent based at least in part on a degree to which the candidate passage contributed to the classification.

15. A non-transitory computer-readable medium comprising one or more computer-executable instructions that, when executed by at least one processor of a computing device, cause the computing device to:
    identify a document that received a classification by a machine learning classifier for data loss prevention;
    identify at least one linguistic constituent within the document that contributed to the classification;
    identify a relevant passage of the document that contextualizes the linguistic constituent;
    display a user interface comprising the linguistic constituent in context of the relevant passage;
    receive user input via the user interface indicating a type of mistake, selected via the user interface from a plurality of types of mistakes, that potentially caused the machine learning classifier to misclassify the document, wherein indicating the type of mistake that potentially caused the machine learning classifier to misclassify the document comprises indicating a basis of classification relied upon by the machine learning classifier that resulted in the machine learning classifier misclassifying the document.

16. The non-transitory computer-readable medium of claim 15, wherein the one or more computer-executable instructions further cause the computing device to provide, via the user interface, a selection element for selecting from the plurality of types of mistakes in response to receiving user input via the user interface indicating that the machine learning classifier misclassified the document.

17. The non-transitory computer-readable medium of claim 15, wherein the type of mistake comprises at least one of:
    a use of a numerical constituent by the classifier;
    a use of a polysemous constituent by the classifier;
    a use of a common constituent by the classifier;

a use of a constituent that is common within an enterprise that is protected by a data loss prevention system that uses the machine learning classifier.

18. The non-transitory computer-readable medium of claim 15, wherein the one or more computer-executable instructions further cause the computing device to modify the machine learning classifier in response to receiving the user input indicating the type of mistake.

19. The non-transitory computer-readable medium of claim 15, wherein displaying the user interface comprising the linguistic constituent in context of the relevant passage comprises displaying the linguistic constituent highlighted within the relevant passage.

* * * * *